(12) United States Patent
Britkin et al.

(10) Patent No.: US 10,592,298 B2
(45) Date of Patent: Mar. 17, 2020

(54) METHOD FOR DISTRIBUTING LOAD IN A MULTI-CORE SYSTEM

(71) Applicant: NFWARE, INC., Wilmington, DE (US)

(72) Inventors: Alexander Britkin, Ekaterinburg (RU); Viacheslav Morozov, Podolsk (RU); Igor Pavlov, Moscow (RU)

(73) Assignee: NFWARE, INC., Wilmington, DE (US)

( * ) Notice: Subject to any disclaimer, the term of this patent is extended or adjusted under 35 U.S.C. 154(b) by 23 days.

(21) Appl. No.: 15/881,174

(22) Filed: Jan. 26, 2018

(65) Prior Publication Data

US 2019/0108068 A1    Apr. 11, 2019

(30) Foreign Application Priority Data

Oct. 5, 2017   (RU) ................................ 2017135568

(51) Int. Cl.

| | | |
|---|---|---|
| *G06F 9/46* | (2006.01) | |
| *G06F 9/50* | (2006.01) | |
| *H04L 12/835* | (2013.01) | |
| *G06F 9/48* | (2006.01) | |
| *H04L 12/861* | (2013.01) | |
| *G06F 9/54* | (2006.01) | |

(52) U.S. Cl.
CPC .............. *G06F 9/5083* (2013.01); *G06F 9/48* (2013.01); *G06F 9/505* (2013.01); *G06F 9/544* (2013.01); *H04L 47/30* (2013.01); *H04L 49/90* (2013.01)

(58) Field of Classification Search
None
See application file for complete search history.

(56) References Cited

U.S. PATENT DOCUMENTS

| | | | |
|---|---|---|---|
| 6,272,522 B1 | 8/2001 | Lin et al. | |
| 8,346,999 B2 | 1/2013 | Dubal et al. | |
| 9,396,154 B2 | 7/2016 | Garg et al. | |
| 2009/0113181 A1* | 4/2009 | Comparan | ............ G06F 9/3851 712/215 |

* cited by examiner

*Primary Examiner* — Wissam Rashid
(74) *Attorney, Agent, or Firm* — BCF LLP

(57) ABSTRACT

A system and method for processing a data packet. The method comprises initiating processing of a received plurality of data packets by CPU cores; tracking, by a scale management routine, processing queues for the CPU cores and their load. In response to an average size of a processing queue being lower than a first pre-determined queue threshold, and a CPU core load being lower than a first pre-determined load threshold, preventing adding new data packets to the processing queue, monitoring emptying of processing queues for each processing CPU core. In response to an average size of a processing queue or a CPU core load being above a second pre-determined upper queue threshold or the second pre-determined load threshold, transmitting all data from processing queues for each processing CPU core to a memory buffer, increasing the number of processing cores by one; and initiating data packet processing.

10 Claims, 9 Drawing Sheets

METHOD FOR DISTRIBUTING LOAD IN A MULTI-CORE SYSTEM

CROSS-REFERENCE

The present application claims convention priority to Russian Utility Patent Application No. 2017135568, filed on Oct. 5, 2017, entitled "METHOD FOR DISTRIBUTING LOAD IN A MULTI-CORE SYSTEM". This application is incorporated by reference herein in its entirety.

FIELD OF THE TECHNOLOGY

The present technology relates to data processing, particularly, to distribution of computing resources in a multi-core system for data packet processing.

BACKGROUND

An efficient usage of a data processing system directly affects the consumption of resources that are necessary for its operation. Particularly, power consumption benefits from an efficient usage of CPU cores. Therefore, there it is recognized in the art that there is a need in the field to use a sufficient, not superfluous number of CPU cores when processing data packets in a multi-core system.

The required number of CPU cores is determined by the quantity of packets that have to be processed in unit time (processing rate). Since the quantity of data packets being processed may vary widely, there is a need to monitor such variations and adjust the number of cores correspondingly.

There are two conventional approaches to solving the problem of adjusting the number of processors: horizontal scaling, wherein it is the number of processing means that is being adjusted, and vertical scaling, wherein it is the computing power of one or more processors that is being adjusted.

A conventional device for data packet switching and server load balancing, described in U.S. Pat. No. 6,272,522 B1, is provided by a general-purpose multiprocessor computer system. The general-purpose multiprocessor computer system comprises a plurality of symmetrical processors coupled together by a common data bus, a main memory shared by the processors, and a plurality of network interfaces each adapted to be coupled to respective external networks for receiving and sending data packets via a particular communication protocol, such as Transmission Control Protocol/Internet Protocol (TCP/IP) and User Datagram Protocol (UDP). A first one of the processors is adapted to serve as a control processor and remaining ones of the processors are adapted to serve as data packet switching processors. The data packet switching processors are each coupled to at least one of the plurality of network interfaces. The control processor receives raw load status data from the external networks and generates load distribution configuration data therefrom. The load distribution configuration data is stored in the main memory for access by the data packet switching processors. The switching processors route received ones of the data packets to a selected one of the external networks in accordance with information included in a header portion of the data packets and the load distribution configuration data. The switching processors perform periodic polling of corresponding ones of the network interfaces to detect a received one of the data packets therein. In addition, the switching processors re-write the routing information included in the header portion of the data packets to reflect the selected one of the external networks.

However, the solution described in the U.S. Pat. No. 6,272,522 B1 does not deal with the problem of an increased or decreased number of incoming data packets.

Another conventional solution, described in U.S. Pat. No. 9,396,154 (B2), discloses a system comprising a multi-core processor, a data buffer, a hardware accelerator, and an interrupt controller. The interrupt controller transmits a first interrupt signal to a first one of the cores based on a first hardware signal received from the hardware accelerator. The first core creates a copy of buffer descriptors (BD) of a buffer descriptor ring that correspond to the data packets in the data buffer in a first virtual queue and indicates to the hardware accelerator that the data packets are processed. If there are additional data packets, the interrupt controller transmits a second interrupt signal to a second core, which performs the same steps as performed by the first core. The first and the second cores simultaneously process the data packets associated with the BDs in the first and second virtual queues, respectively.

However, the solution described in the U.S. Pat. No. 9,396,154 B2 does not deal with the problem of an increased or decreased number of incoming data packets.

Yet another conventional solution described in the U.S. Pat. No. 8,346,999 B2 discloses a method for dynamically receiving queue balancing with high and low thresholds, the method comprising the following steps: assigning a network application to at least one first core processing unit, from among a plurality of core processing units; assigning a first receive queue to the first core processing unit, wherein the first receive queue is adapted to receive packet flow associated with the network application; defining a high threshold for the first receive queue; monitoring the packet flow in the first receive queue and comparing a packet flow level in the first receive queue to the high threshold; wherein if the packet flow level exceeds the threshold based on the comparing, generating a queue status message indicating that the packet flow level in the first queue has exceeded the queue high threshold; and generating, in response to the queue status message, a new core assignment to assign the network application to a second core processing unit.

However, the solution described in the U.S. Pat. No. 8,346,999 B2 deals only with assigning a specific application to another core, which would most likely result in an unequal load distribution and non-optimum core load, thus decreasing the method efficiency.

SUMMARY

The objective of the present technology is to optimize the processing core load through dynamic scaling of the number of cores, while preserving the order of data packets within a client session, resulting in an optimized usage of computing resources of the system that processes data packets and in a lower power consumption of said system.

The present technology may optimize the usage of computing resources by employing an optimum number of data packet processing cores, which may satisfy an energy efficiency criterion.

In the method for processing data packets in a multi-core system, the number of cores utilized may be scaled (i.e. increased or decreased) while preserving the order of data packets within a client session. To achieve this, processing queues for the plurality of CPU cores and their load are tracked, and if the average size of a processing queue is lower than a pre-determined threshold value, then the scale management routine prevents adding of new data packets to the processing queue, and after the queues for each processing core have been emptied, decreases the number of processing cores and then resumes the processing; or if the size of a processing queue is higher than a pre-determined threshold value, then the scale management routine sends all data from processing queues for each processing CPU core to a memory buffer, increases the number of processing cores and resumes the processing.

In one aspect, there is provided a method for processing data packet, executable by an electronic device, the electronic device including a plurality of CPU cores, the electronic device executing a scale management routine.

In accordance with at least one non-limiting embodiment, the method for processing a data packet comprises receiving a plurality of data packets to be processed; initiating processing of the plurality of data packets by the plurality of CPU cores; tracking, by the scale management routine, processing queues for the plurality of CPU cores and their load. In accordance with at least one non-limiting embodiment, the method further comprises in response to an average size of a processing queue being lower than a first pre-determined queue threshold, and a CPU core load being lower than a first pre-determined load threshold: preventing, by the scale management routine, adding new data packets to the processing queue, and monitoring emptying of processing queues for each processing CPU core; and in response to a given queue for a given processing core having been emptied, decreasing a number of processing cores by one, initiating data packet processing using a decreased number of processing cores. In accordance with at least one non-limiting embodiment, the method further comprises in response to at least one of: an average size of a processing queue or a CPU core load being above than a second pre-determined upper queue threshold or the second pre-determined load threshold, respectively: transmitting, by the scale management routine, all data from processing queues for each processing CPU core to a memory buffer, increasing the number of processing cores by one; and initiating data packet processing using an increased number of cores.

In accordance with at least one non-limiting embodiment, the method may further comprise decreasing, by the scale management routine, the number of processing CPU cores by two, if the average size of a processing queue is lower than a second pre-determined queue threshold.

In accordance with at least one non-limiting embodiment, the method may further comprise tracking, by the scale management routine, time during which at least one of either the average size of a processing queue or the CPU core load is lower than the first pre-determined queue threshold or the first pre-determined load threshold, respectively, and in case said time exceeding a pre-determined value, decreasing the number of processing CPU cores.

In accordance with at least one non-limiting embodiment, the method may further comprise increasing, by the scale management routine, the number of processing CPU cores by two, if the average size of a processing queue is higher than a second pre-determined lower queue threshold.

In accordance with at least one non-limiting embodiment, the method may further comprise tracking, by the scale management routine, time during which at least one of either the average size of a processing queue or the CPU core load is above the first pre-determined queue threshold or the first pre-determined load threshold, respectively, and in case said time exceeds a pre-determined threshold value, increasing the number of processing CPU cores.

In accordance with at least one non-limiting embodiment, the method may further comprise determining, by the scale management routine, the rate of change of the average size of a processing queue, and in case said rate exceeding a pre-determined threshold value, further adding a pre-set number of processing cores.

In accordance with at least one non-limiting embodiment, the scale management routine may set the threshold time value based on the CPU core load, and the higher the load is, the lower may be the threshold time value.

In accordance with at least one non-limiting embodiment, the decreasing a number of processing cores by one may be executed only if the there is more than one processing core.

In accordance with at least one non-limiting embodiment, increasing the number of processing cores by one may be executed only if a maximum capacity is not reached.

In another aspect, there is provided a device for data packet processing. In accordance with at least one non-limiting embodiment, the device for data packet processing comprises an input interface configured to receive data packets; a plurality of cores configured to process data packets; a memory configured to store data; an output interface configured to transmit data packets that have been processed; a scale management routine configured to redirect data packets and determine the number of cores. In accordance with at least one non-limiting embodiment, the plurality of cores include a plurality of receiving cores configured to process data packets sent by the input interface in their queues and then to send these packets to the queues of processing cores; a plurality of processing cores configured to process data packets sent in their queues and then to send processed packets to the queues of transmitting cores; and a plurality of transmitting cores configured to process data packets sent in their queues and then to send these packets to the output interface.

In accordance with at least one non-limiting embodiment, the device for data packet processing is configured to carry out the method for processing a data packet.

DETAILED DESCRIPTION OF THE NON-LIMITING EMBODIMENTS

The objective of the present technology is to provide an optimum number of CPU processing cores in order to ration the usage of computing resources and to lower power consumption.

In order to achieve the objective, a multi-core system for data packet processing is described herein, along with the method for scaling (i.e. increasing or decreasing) the number of cores, while preserving the order of data packets within a client session.

It should be noted that the present technology deals with the vertical scaling approach, while also preserving the order of data packets within a client session.

In at least one non-limiting embodiment, a data packet is represented by network packet of a specialized format that is transmitted via a computer network, a databus, etc. in packet mode. For example, a 64-byte network packet may contain 16-byte header (containing information about the data packet), while the rest 48 bytes are its payload.

Figure 1:
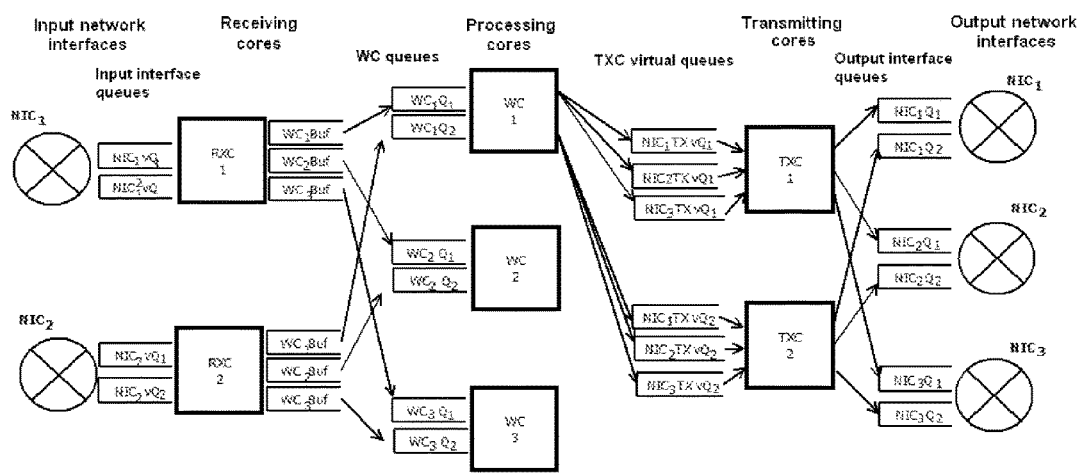
FIG. 1 depicts a block diagram of the architecture of a multi-core system for packet processing, in accordance with at least one non-limiting embodiment.

Referring to FIG. 1, the system for data packet processing comprises an input interface that receives incoming data packets and is connected via communication lines to at least one receiving core (RXC), from which data packets that have been received are re-directed to the queuing units of processing cores (WC). Queuing units are connected to their respective processing cores that process data packets and send them to the queuing units of transmitting cores (TXC), and subsequently to transmitting cores themselves. Finally, TXC cores send the information to the output interface.

The system for data packet processing has three types of cores, namely:

1.—receiving cores (RXC) that process packet queues that originate from input network interfaces and then re-direct them to the queues of processing cores (WC);

processing cores (WC) that process packets in their respective input queues and then send them to the queues of transmitting cores (TXC); and transmitting cores (TXC) that process packets in their respective input queues and then send them to the queues of output network interfaces.

In at least one non-limiting embodiment, the entire set of CPU cores may be represented by virtual cores, or vCPU, i.e. cores that support hyper-threading, a technique that allows to utilize a single physical core as several cores.

In at least one non-limiting embodiment, said types of cores (RXC, WC, TXC), along with the scale management routine (WCScaleManager) are implemented as software routines that operate as separate threads. The load is distributed in the multi-core system by means of a single process involving all said threads, wherein their operation is implemented in such a way, so that each thread is carried out exclusively by a single CPU core (so-called "CPU pinning"). For example, to attach a thread to a specific core, a system call is sent to the OS scheduler.

The system call may be a call to the operating system core made by an application in order to perform a certain operation.

The OS scheduler may be an application (software routine, service or daemon) that executes other applications depending on specified criteria, such as: time; OS state change (going into sleeping mode, non-active state, etc.); and/or a request by the administrator made via the user interface or remotely.

The numbers of cores of all types may be adjusted to utilize their resources more efficiently. For instance, if the data packet flow intensifies, the number of cores may be increased, otherwise, if the data packet flow abates, the number of cores may be decreased, at least, in order to: minimize power consumption; or re-assign the cores that have been released to other tasks requiring cores of a given type (e.g. in other multi-core systems for packet processing).

The increase of the number of cores of a given type may be initiated at least in one of the following cases:

at least one of the minimum, average or maximum size of the queue of the core type in question exceeds the threshold value, which may be either an absolute value (e.g. 1000 data packets) or a relative value (e.g. +200 data packets from the previous value); or the core load exceeds the threshold value.

The decrease of the number of cores of a given type may be initiated at least in one of the following cases:

at least one of the minimum, average or maximum size of the queue of the core type in question is lower than the threshold value, which may be either an absolute value or a relative one; or the core load does not exceed the threshold value.

In one example, in a given moment in time, each WC core holds 500 data packets, and 10 cores have been dedicated to process them so far. Over time, the number of data packets in these queues has fallen to 250, therefore, the number of cores has also been decreased to 5.

In another example, there is a total of 800 data packets in all WC queues, and the load of 16 dedicated cores is 96%, while the pre-determined upper threshold is 85%. Therefore, 4 more cores have been dedicated to processing of these data packets from the pool of free cores.

Yet in another example, the total number of data packets in all WC queues has changed from 10 to 1240, and 12 cores have been dedicated to process them, so their load varies from 2% to 98%. The average number of data packets in these queues is 380, which is higher than the threshold value of 200, while the average load is 30%, which is lower than the threshold value of 58%. 7 cores have been, therefore, released and moved back to the pool of free cores, while 5 cores remained to process data packets, which increased their average load to 65%, boosting their efficiency.

In the system as described herein, queues that serve RXC and TXC cores may not necessarily depend on the number of these cores; instead, they may be linked to network interfaces, namely receiving and transmitting ones. Queues that serve WC processing cores, may be created at the same time as these cores.

When processing packets, receiving cores (RXC) and transmitting cores (TXC) may call only the data of the packet that is currently being processed, while processing cores (WC) may be able to create, read, and modify client session data in the course of their operation, i.e. data that are common for more than one data packet.

RXC and TXC cores may be added or released at any time regardless of data packets they process and processing methods used. No additional actions are required.

However, WC cores may not be added or released without additional actions, since if the number of cores is simply increased or decreased, client session packets will immediately go to new cores, while packets already in queues will still be processed, i.e. packets within the same client session will be processed on two cores simultaneously: the one that was determined before and the other one that has been determined later. This may result in possible errors, because the common session data are called from different cores, which is described in more detail below, or this may require an architecture with error blockers (i.e. a synchronizing architecture which works more slowly than the proposed one). Besides, since data packets of the same client session may be processed on two cores at the same time, their order may be broken.

In order to speed up data packet processing in a multi-core system, systems without blockers have proved to be most efficient (their data architecture may provide that the cores access only their designated data). When processing data packets in the proposed system, processing speed is boosted by processing data packets with the same set (source IP, source port, destination IP, destination port, protocol) on the same WC.

Data packets may be distributed among WC cores in accordance with convolution function number of the given set and the number of WCs, where the convolution function may be presented as at least one of: the algorithm of finding the checksum of the given set (e.g. CRC32); and a hash function that provides a pre-defined value distribution (e.g. even distribution).

For example, based on the source IP (127.0.0.1), source port (3001), destination IP (192.168.1.1), destination port (80) and protocol identifier (UDP=110), an initial string is generated:

127.0.0.1:3001:192.168.1.1:80:110 which is used to calculate CRC32:

$$crc32=0x992dd6b9$$

Then, the calculated value is divided modulo number of WC cores, and the result is the serial number (index) of the WC core to receive the given packet (e.g. $index=0x992dd6b9_{crc32} \mod 17_{WC\ core\ number}=0x2_{WC\ core\ index}$).

In at least one non-limiting embodiment, the values described above may be presented as a JSON structure:

```
{
src_ip: '127.0.0.1',
src_port: '3001',
dst_ip: '192.168.1.1',
dst_port: '80',
protocol: '110',
}
``` which is then convoluted into base64 format, and then the received data are used to calculate md5:

$$md5=4b674b01055c1c13b98aaffe87ec52d5$$

After the number of WC cores has been adjusted, the packets that were to be processed on some core (before the adjustment), may have to be processed on a different core. Therefore, packets in WC processing queues at the moment of adjustment may pose a danger of calling the same data from different cores, in case a data packet containing any similar combination of elements used to calculate the convolution function (source IP, source port, destination IP, destination port, protocol) is processed on a different WC.

There may be the following scenarios for system operation during the transition period after the WC number has been adjusted and before all data packets from all WC queues at the moment of adjustment are processed.

Scenario 1: not adding new packets to the WC processing queue until all packets from all WC queues, that have been queued before the WC number was changed, have been processed.

Scenario 2: returning all packets from WC processing queues to the receiving core and putting them into the beginning of the queue of packets to be re-directed to WC.

Scenario 1 may be best suited to the situation, when the WC number has to be decreased.

Scenario 2 may be best suited to the situation, when the WC number has to be increased.

It may be useful that the transition period, when the number of cores is being adjusted, runs as quickly as possible, so that the system is able to resume receiving and processing data packets and return to its normal operation. The more cores are processing packets during the transition period, the faster said packets may be processed. Therefore, each case (core number increase/decrease) may require a scenario that would enable as many cores as possible during the transition period. The core number decrease may use Scenario 1 (first, everything should be processed, and then the number of cores will be decreased), while core number increase may use Scenario 2 (first, the number of cores may be increased, then the processing may start).

Figure 2:
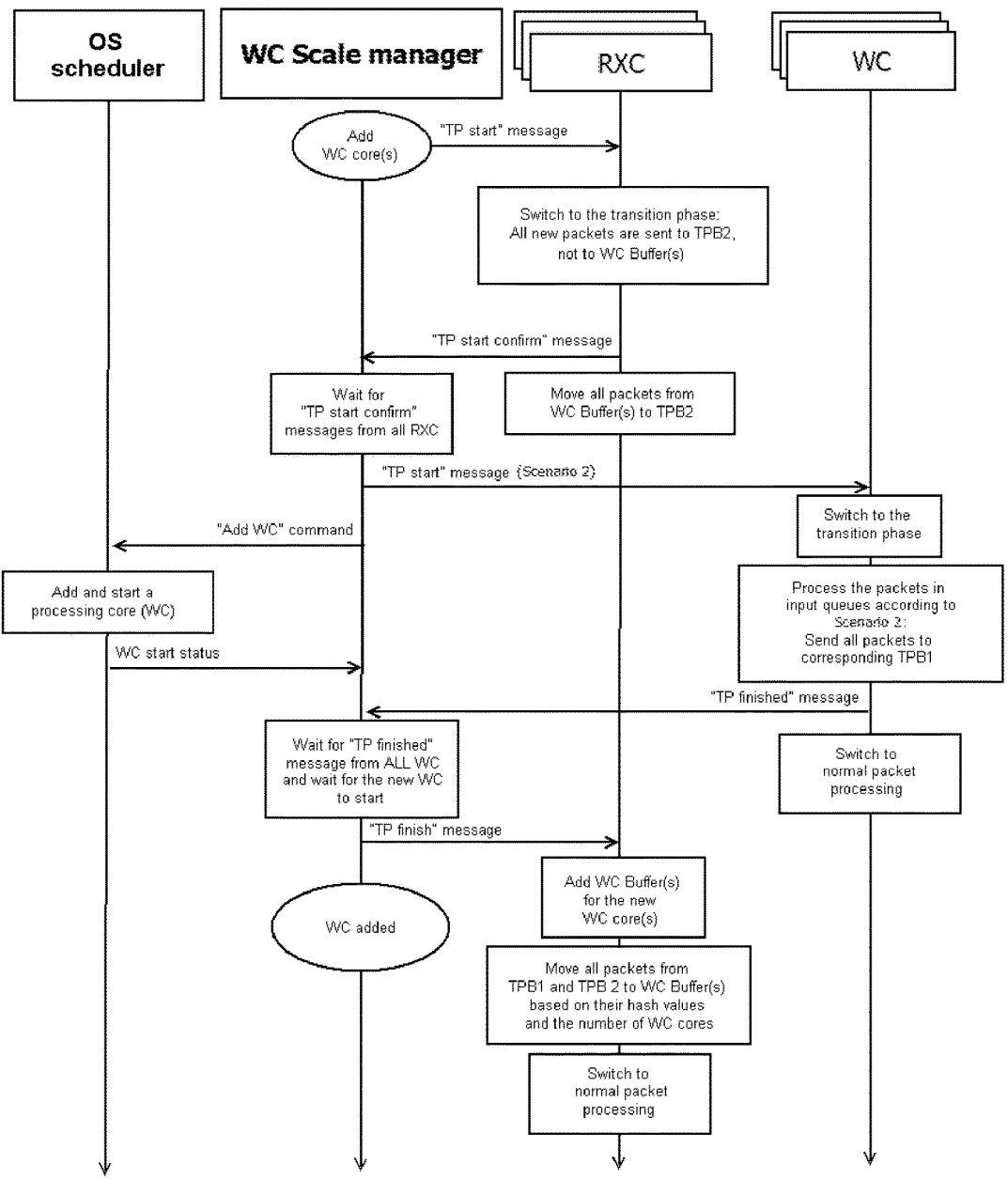
FIG. 2 depicts a block diagram of a flowchart of a core operation, when the number of processing cores is increased, in accordance with at least one non-limiting embodiment.
Figure 3:
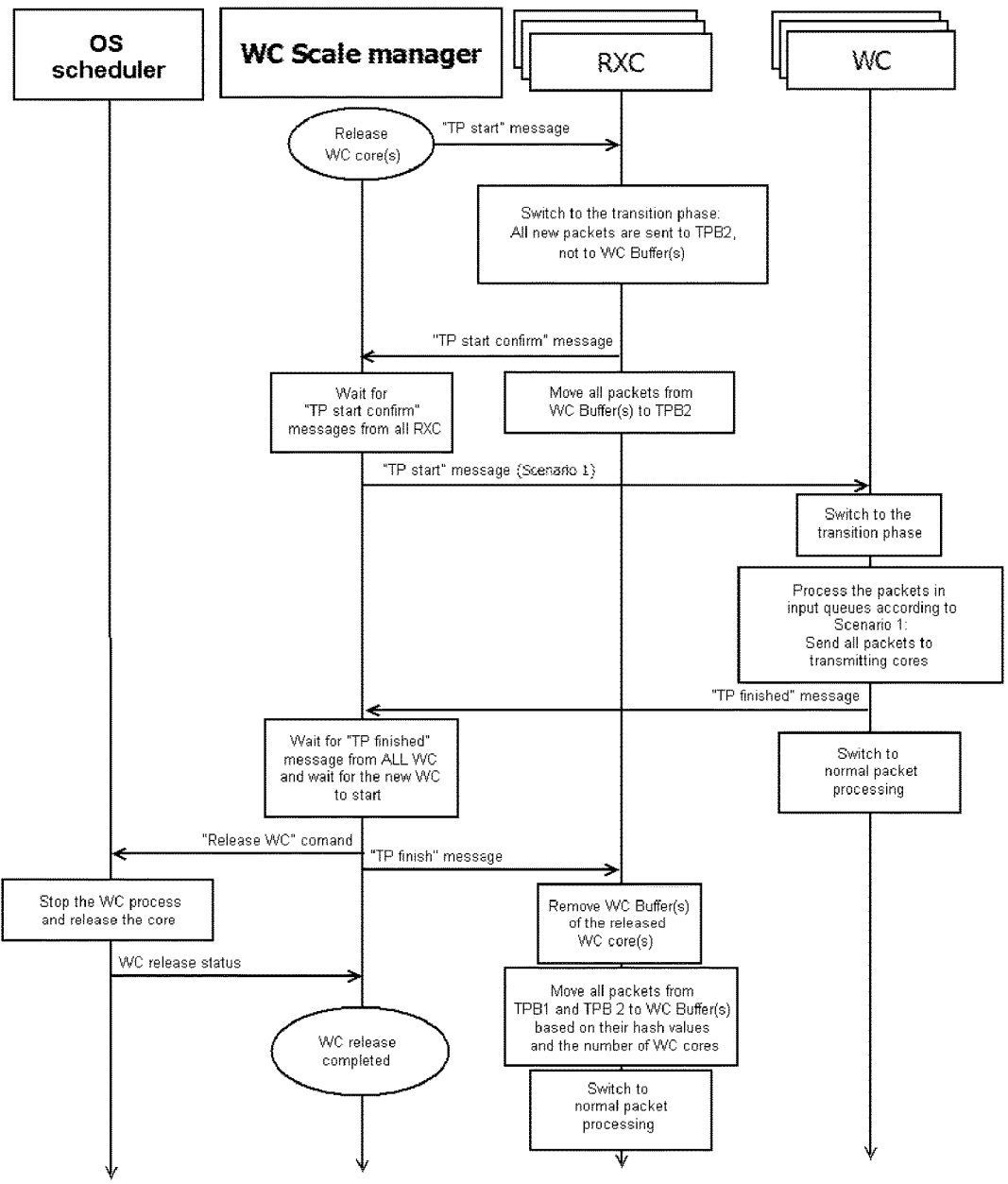
FIG. 3 depicts a block diagram of a flowchart of a core operation, when the number of processing cores is decreased, in accordance with at least one non-limiting embodiment.

FIG. 2 depicts a block diagram of a flowchart of core operation, when the number of processing cores is increased, in accordance with at least one non-limiting embodiment. FIG. 3 depicts a block diagram of a flowchart of a core operation, when the number of processing cores is decreased, in accordance with at least one non-limiting embodiment.

WCScaleManager (WC core scale management routine) as referred to herein is a software tool/software routine that monitors triggers for core number adjustment.

When there is a need to increase the number of processing cores, WCScaleManager may run the process according to the flowchart shown in FIG. 2. When there is a need to decrease the number of processing cores, WCScaleManager may run the process according to the flowchart shown in FIG. 3.

Before there is a need to adjust the number of processing cores, the system operates normally (NormalPacketProcessing mode). When the number of processing cores is adjusted, WCScaleManager switches receiving cores and processing cores into the transition phase for some time. After all necessary procedures have been completed, they may return to normal operation.

In at least one non-limiting embodiment, the network interface supports the Receive Side Scaling (RSS) technology, so that incoming data packets could be processed by several receiving cores (RX) at once. Otherwise, information from the network interface may be read by one receiving core only.

Each input interface may be assigned a number of NIC-Queue ($NIC_1Q_1$, $NIC_1Q_2$, . . . ) queues (physical NIC queues), each number proportionate to the number of receiving cores. For example, if there are two receiving cores, there may be 2, 4, 6 and so on queues. In case there are 6 queues in total for 2 receiving cores of the first network interface ($NIC_1$), the $NIC_1Q_1$, $NIC_1Q_3$, and $NIC_1Q_5$ queues would be assigned to the receiving core 1 ($RX_1$), while the $NIC_1Q_2$, $NIC_1Q_4$, and $NIC_1Q_6$ queues would be assigned to the receiving core 2 ($RX_2$).

A queue is a set of data that may be accessed based on the First In-First Out (FIFO) principle. Elements may be added to the end of a queue only, while they may be selected from the beginning of a queue only, wherein the selected element is removed from the queue.

Data packets that were received by the network interface may then be sent to one of the physical NIC Q queues using the RSS technology supported by the interface. Each receiving core may read all packets from associated queues of all input interfaces in cycles and store them in memory; after that, all operations regarding transfer of packets between buffers, queues, and cores may be performed through links/ pointers to the memory area, where a given data packet is stored. For each packet, the receiving core may calculate its convolution function number from the following attributes: source IP, source port, destination IP, destination port, protocol. Depending on the result, said data packet may be transferred to a WCBuffer. Each WCBuffer may be associated with a WC core and may be used to stack packets, which may then be transferred to a corresponding WCQueue in bulk. It may be done in order to avoid multiple additions to the queue, which may be quite resource consuming, by moving several packets at a time. There may be various triggers to transfer data packets from WCBuffer to WCQueue: for instance, if the number of data packets read from NIC queues during a given cycle in the buffer exceeds a pre-determined value, or if said number is too low, then waiting is over, and these packets may be immediately sent from WCBuffer to WCQueue.

The RSS technology may involve hardware distribution of incoming data packets among several queues based on the convolution function values of each packet contents. It is assumed, therefore, that each CPU core processes its own packet queue. It should be noted that the RSS technology can be implemented differently, such as software, firmware or hardware, as well as combination thereof.

The WC core reads packets from its input queues (WCQueue) one by one, processes them and then sends to the output interface.

In at least one non-limiting embodiment, WCScaleManager sends the "TP started" message (see FIG. 2) to switch receiving and processing cores into the transition phase.

Referring to FIG. 2 and FIG. 3, when the scale management routine has determined the need to increase/decrease the number of processing cores, it may send the transition phase start command to receiving cores(see). As a result, each receiving core may proceed to a transition phase: all packets to be processed by the receiving core during the transition phase would be transferred by the receiving core to the receiving core transition phase buffer (see TPB2 in FIG. 5), rather than to WC buffers (see WCBuffer in FIG. 5). A certain amount of space may be reserved in each TPB2 buffer to place data packets from WC buffers there. After that, each receiving core may send a transition phase switch confirmation command to the scale management routine. Then, the receiving core may send packets from WC buffers (packets, which have been distributed to be sent to corresponding WC queues—see WCQueue in FIG. 5) to the TPB2 buffer and may place them at the beginning, which would allow to preserve the order of data packets in the client session after their processing resumes normal operation.

In at least one non-limiting embodiment, the receiving core controls WCBuffer as follows:
the receiving core knows the quantity of data packets in its WCBuffers;
the receiving core reserves a corresponding amount of space to place enough packet pointers (all operations involving data packet transfer between buffers/cores, etc. may be performed with packet pointers, whereas data packets themselves may be not moved anywhere at all).

The scale management routine waits transition phase switch confirmation from all receiving cores. Having received such confirmations, it may send the transition phase start signal to processing cores (WC), giving them the transition scenario (see Scenario 1 and Scenario 2 above).

In at least one non-limiting embodiment, the scale management routine communicates with receiving cores using inter-process communication (IPC) means, such as exchanging signals or messages.

Inter-process communication may involve data exchange between threads of the same process or of different processes. IPC is performed through mechanisms provided by the OS core or a process that utilizes OS mechanism to carry out new IPC functions. IPC may be performed both within a computer network, as well as on one computer.

IPC mechanisms provided by operating systems may include: message exchange mechanisms; synchronization mechanisms; memory sharing mechanisms; remote procedure call (RPC) mechanisms.

IPC methods may operate files, signals, sockets, channels, named and anonymous pipes, shared memory, message exchange, message queue, semaphores, memory-mapped files, etc.

Having received a transition phase start signal, each WC core may proceed to a transition phase: they process packets in their queues according to the transition phase scenario; when finished, they may send a processing finish confirmation signal to the scale management routine, and then they may resume their normal operation.

Referring to FIG. 2, if the number of processing cores is to be increased, the scale management routine may send the transition phase start signal to WC cores and after that, without waiting for the transition phase finish confirmation signal, may send a command to add one or more WC cores to the OS scheduler.

In at least one non-limiting embodiment, WC cores interact with the operating system through at least one of: system calls; API functions provided by the operating system; API functions of third-party applications that interact with the operating system; inter-process communication means for direct data exchange with OS processes.

A system call may be a call to the operating system core made by an application in order to perform a certain operation. At the same time, contemporary operating systems support time sharing between several computing processes (multitasking) and authority sharing that prevent applications from accessing data of other programs and hardware. The OS core may be executed in the privileged CPU mode. To perform an inter-process operation, or an operation that requires access to hardware, the program may call the core that, depending on its authorities, would either carry out said call or reject it.

The operating system API is a set of basic functions for application programming interfaces provided by the operating system. The API provides a method for direct communication between applications and the OS.

Referring to FIG. 3, if the number of processing cores is to be decreased, the scale management routine may wait for the transition phase in processing cores to finish, and only after that may send a command to remove one or more WC cores to the OS scheduler.

When the OS scheduler, which is responsible for assigning tasks to cores, receives a signal to add one or more WC cores, it may distribute the tasks in such as way, so that a certain CPU core would be used exclusively to run the WC process. In this case, the WC process would be run on a separate CPU core. Having received a signal to decrease the number of processing cores, the OS scheduler releases said cores.

In at least one non-limiting embodiment, the OS scheduler receives a system call—a notification that the WC thread would be run exclusively on a certain core (i.e. CPU pinning).

After the scale management routine has received processing finish confirmation signals (according to the transition phase scenario) from all WC cores, it sends a transition phase finish command to the receiving core in order to switch it to normal operation.

As a result of the steps described above, the multi-core system may either add one or more WC cores (see FIG. 2) or release one or more WC cores (see FIG. 3). In at least one non-limiting embodiment, in order to prevent errors, the system may ensure processing of data packets from the same client session only on one core, while also preserving the order of data packets in the client session. Put another way, in some alternative non-limiting embodiments of the present technology, the system may prevent processing of data packets from the same client session on different cores simultaneously.

In at least one non-limiting embodiment, there are several threshold values, which, if exceeded, would prompt the system to adjust the number of cores by specified values. For example, if the queue length exceeds the first threshold value, the number of cores may be increased/decreased by one; if the queue length exceeds the second threshold value, the number of cores may be increased/decreased by two, and so on.

WCScaleManager (the scale management routine) may be implemented as a separate program thread on a core.

Figure 4:
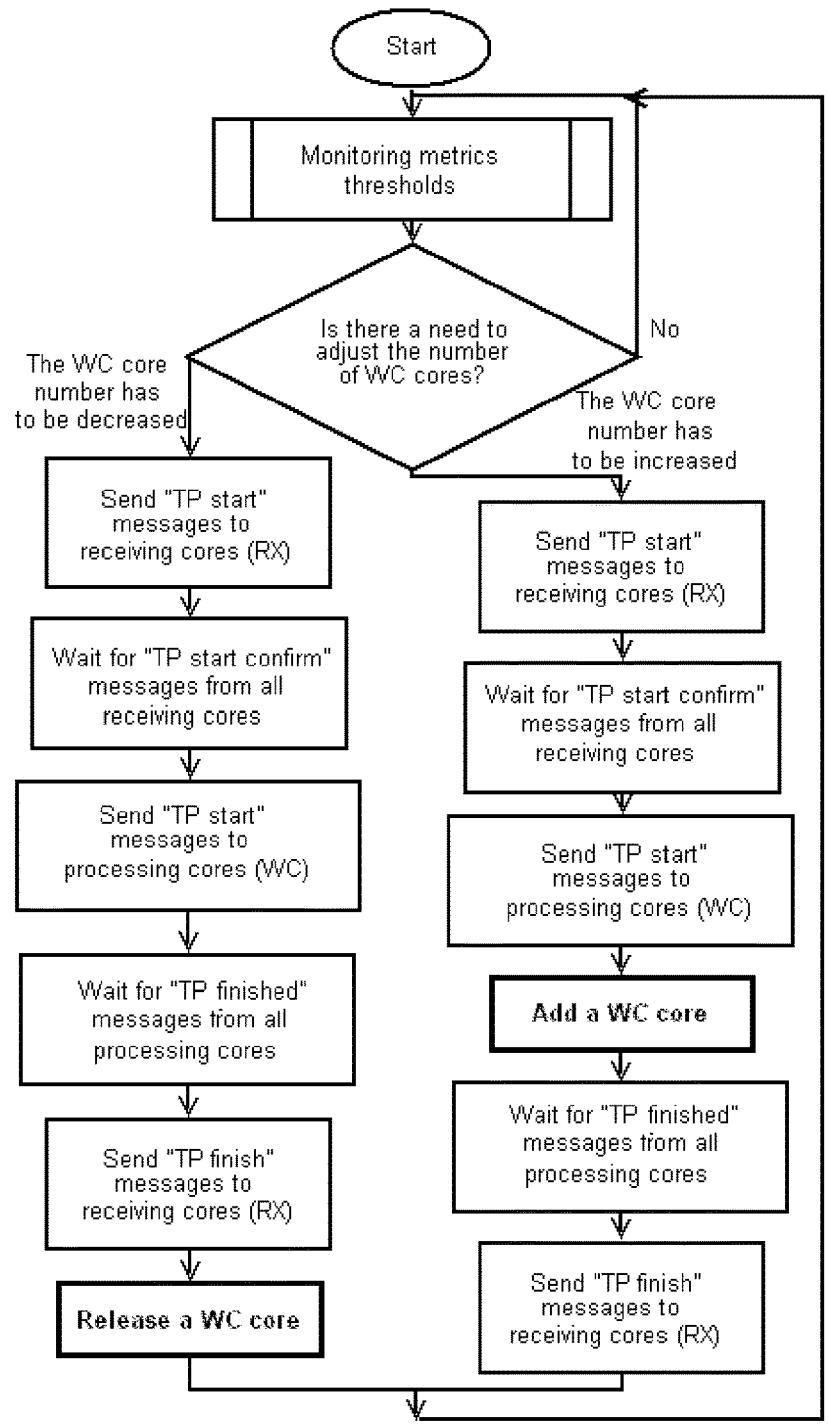
FIG. 4 depicts a block diagram of a flow chart of a method of a scale management routine (WCScaleManager), in accordance with at least one non-limiting embodiment.

FIG. 4 depicts a block diagram of a flow chart of a method of a scale management routine (WCScaleManager), in accordance with at least one non-limiting embodiment.

In at least one non-limiting embodiment, WCScaleManager monitors metric values, and in case they exceed threshold values, it initiates WC core number adjustment.

Threshold Values for Core Number Adjustment

In accordance with at least some non-limiting embodiments of the present technology, the scale management routine is configured to automatically decide whether the number of processing cores should be adjusted. In order to make such a determination, the scale management routine is configured to monitor metrics. These metrics may include various values describing WC load, such as: Average load of CPU cores that run WC (CU (CPUCoreUtilization)); Average load of input WC queues (QU (QueueUtilization)).

In at least one non-limiting embodiment, average CPU core load is determined based on the analysis of at least one of: system calls made by said core (e.g. the number of such calls); data that are processed by said core (e.g. the volume of such data).

In at least one non-limiting embodiment, the average length of input queues is determined based on current length data (e.g. the number of packets) routinely received from its input queues by the WCScaleManager unit using one of the methods of inter-process communication (e.g. Remote Procedure Call (RPC)).

Remote Procedure Call (RPC) relates to technologies that allow computer programs to call functions or procedures in a different address space (usually, on remote computers). Usually, an RPC implementation comprises two components: a network protocol for client-server exchanges and an object serialization language or a structure serialization language, for non-object-based RPCs. Various RPC implementations may have differing architectures and capabilities: some of them may use SOA architecture, others may use COBRA or DCOM architectures. On the transport level, RPC may utilize TCP and UDP protocols, though some RPCs may be based on HTTP, which breaks the ISO/OSI architecture, since HTTP was not originally designed as a transport protocol.

Various strategies may be used for switching, such as:
Simple threshold values. In this case, a higher and a lower thresholds with respective time intervals may be set for each metric. When a metric exceeds either the higher or the lower threshold for the given time interval, the WC number is adjusted.

Complex threshold values. In this case, the WC number is adjusted only if several metrics exceed their thresholds for the given time interval at once. Complex rules may also contain logical gates, such as AND, OR.

In each case, the adjustment value may be either absolute (e.g. 1 or 2, to increase/decrease the WC number by 1 or 2), or relative, i.e. depending on the total number of WC cores that are currently active (e.g. 10%, to increase/decrease the WC number by 10%). If a relative adjustment value is set, the rounding direction is also be stated (or set by default): either rounding up (e.g. a total of 12 WC to be adjusted by 20% results in 12*20%=2.4, would be adjusted by 3), rounding down (12*20%=2.4=2), or using a regular mathematical model (12*20%=2.4=2).

For instance, rules may be presented as:
<metrics><threshold type><threshold value>[<time interval>]=<change type><change amount>,
where:
<metrics> is one of the above: CU, QU above;
<threshold type> is either a < or a >, where > is an upper threshold, and < is a lower threshold;
<threshold value> is the actual threshold value for a metric in its units (e.g. 60%);
<time interval> is the time interval (s=seconds, ms=milliseconds, etc.);
<change type> is either an increase (+) in WC number, or a decrease (−); and
<change amount> is the number of WC or a percentage of the current WC number.

For example:
CU>80% [10 s]=+1. If the average load of CPU cores supporting WC cores exceeds 80% for 10 seconds, the WC number would be increased by 1.

QU<20% [5 s]=−20%. If the average length of WC input queues is lower than 20% for 5 seconds, the WC number would be decreased by 20%.

CU>80% [10 s] AND QU>70% [10 s]=+1. If the average core load exceeds 80% for 10 seconds, while the length of WC input queues is higher than 70% for 10 seconds, the WC number would be increased by 1.

Referring now to FIG. 4, right-hand branch, depicted therein is a portion of the flowchart, in which a WC core should be added. In the non-limiting embodiment, WCScaleManager signals RXC cores that the transition phase is about to start, then waits for each RXC core to confirm receiving this signal; then notifies each WC core about the beginning of the transition phase (TP), adding one or more WC cores; then waits until all WC cores finish their transition phases and signals RXC cores that the transition phase has ended; and, finally, initiates normal operation with the increased number of WC cores.

Referring now to FIG. 4, left-hand branch, depicted therein is a portion of the flowchart, in which a WC core should be released. In the non-limiting embodiment, WCScaleManager signals RXC cores that the transition phase is about to start, then waits for each RXC core to confirm receiving this signal; then notifies each WC core about the beginning of the transition phase (TP); then waits until all WC cores finish their transition phases and signals RXC cores that the transition phase has ended, releasing one or more WC cores; and, finally, initiates normal operation with the decreased number of WC cores.

Figure 5:
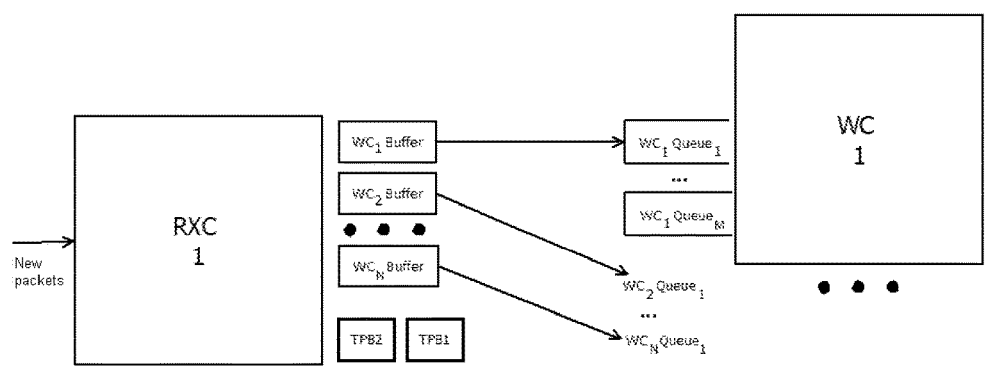
FIG. 5 depicts a block diagram of buffers and queues used in exchanges between a receiving core (RXC) and a processing core (WC), in accordance with at least one non-limiting embodiment.

FIG. 5 depicts a block diagram of buffers and queues used in exchanges between the receiving core and the processing core, in accordance with at least one non-limiting embodiment.

Processing core buffers ($WC_1Buffer$ ... $WC_NBuffer$, where N is the total number of WC cores) are software routines used to store data packets until receiving cores send them to processing core queues ($WC_1Queue_1$ ... $WC_N$-$Queue_1$, where N is the total number of WC cores).

Data packets may be routinely transferred to processing core queues, after several cycles of receiving packets from network interfaces, e.g. $RX_1$ may send packets from $WC_1Buffer$ to $WC_1Queue_1$ of the $WC_1$ processing core, and may send packets from $WC_kBuffer$ to $WC_kQueue_1$ of the $WC_k$ processing core, where k is the serial number of the processing core. Transition phase buffers (TPB) TPB1 and TPB2 may be used to store data packets during the transition phase. During the transition phase, TPB1 may store packets from processing core queues ($WC_1Queue_1$ ... $WC_NQueue_1$, where N is the total number of WC cores), while TPB2 will store packets from processing core buffers ($WC_1Buffer$ ... $WC_NBuffer$, where N is the total number of WC cores). Also, TPB2 may store packets read from the input network interface.

Figure 6:
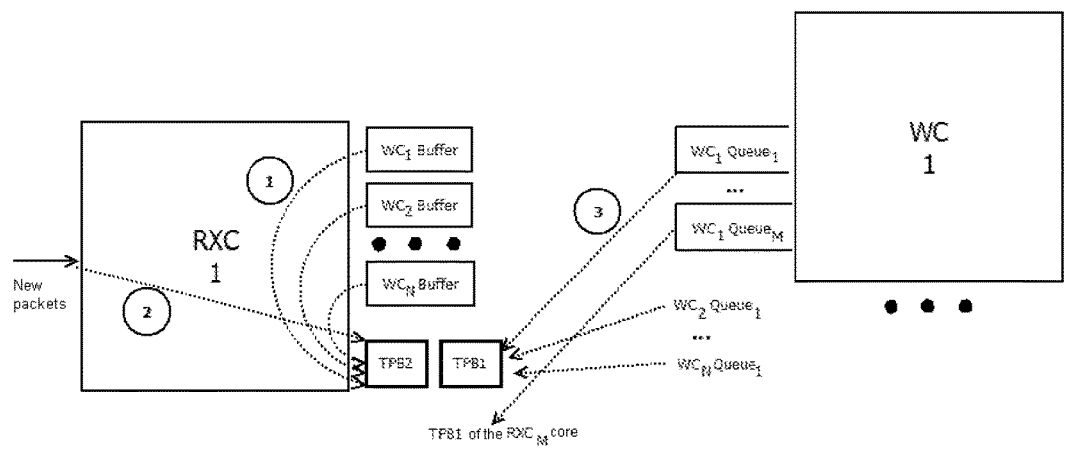
FIG. 6 depicts a block diagram of the order of transition phase buffer filling at the beginning of the transition phase, in accordance with at least one non-limiting embodiment.

FIG. 6 depicts a block diagram of the order of data packets placed in processing core buffers ($WC_1Buffer$ ... $WC_NBuffer$, where N is the total number of WC cores) and processing core queues ($WC_1Queue_1$ ... $WC_NQueue_1$, where N is the total number of WC cores) in transition phase buffers TPB1 and TPB2 at the beginning of the transition phase. At the beginning of the transition phase, the RXC1 receiving core may transfer all packets from processing core buffers ($WC_1Buffer$ ... $WC_NBuffer$, where N is the total number of WC cores) and place them at the beginning of its TPB2 buffer. All packets read by the receiving core $RXC_1$ from the input network interface during the transition phase may be sent to TPB2. After receiving the transition phase start signal, all processing cores $WC_1$ ... $WC_N$ may transfer all packets from their input WCQueues to TPB1 buffers of corresponding receiving cores (RXC). Packets from $WC_1Queue_1$ ... $WC_NQueue_1$ may be sent to TPB1 of $RXC_1$, and packets from $WC_1Queue_k$ ... $WC_NQueue_k$ may be sent to TPB1 of $RXC_K$, where k is the number of the receiving core, and N is the total number of WC cores.

Figure 7:
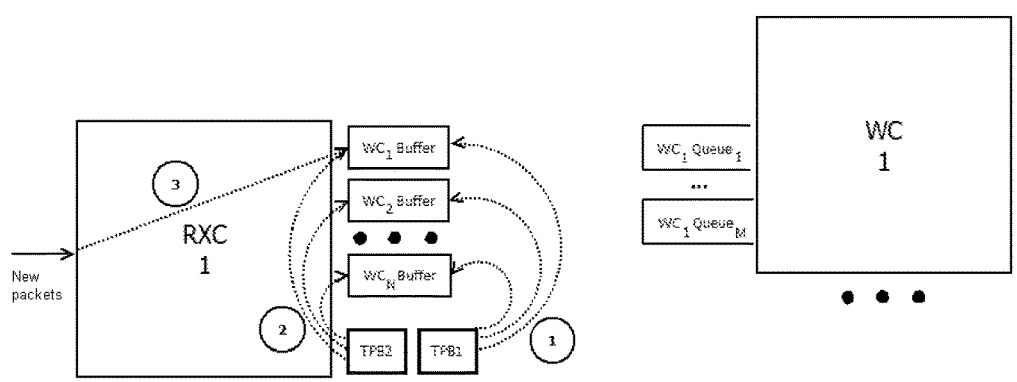
FIG. 7 depicts a block diagram of the order of transition phase buffer emptying after the end of the transition phase, in accordance with at least one non-limiting embodiment.

FIG. 7 depicts a block diagram of the order of data packet processing by a receiving core after the end of the transition phase, in accordance with at least one non-limiting embodiment. When the transition phase ends, a receiving core (RXC) first may send all packets from the TPB1 buffer, then all packets from the TBP2 buffer to $WC_1Buffer$ ... $WC_N$-Buffer, after which the core may switch back to its normal mode sending packets received from the input network interface to $WC_1Buffer$ ... $WC_NBuffer$. Packets may be sent to $WC_1Buffer$ ... $WC_NBuffer$ based on their convolution function values and the number of processing cores. Such order of sending data packets from transition phase buffers may allow preserving the order of data packets within a client session.

Figure 8:
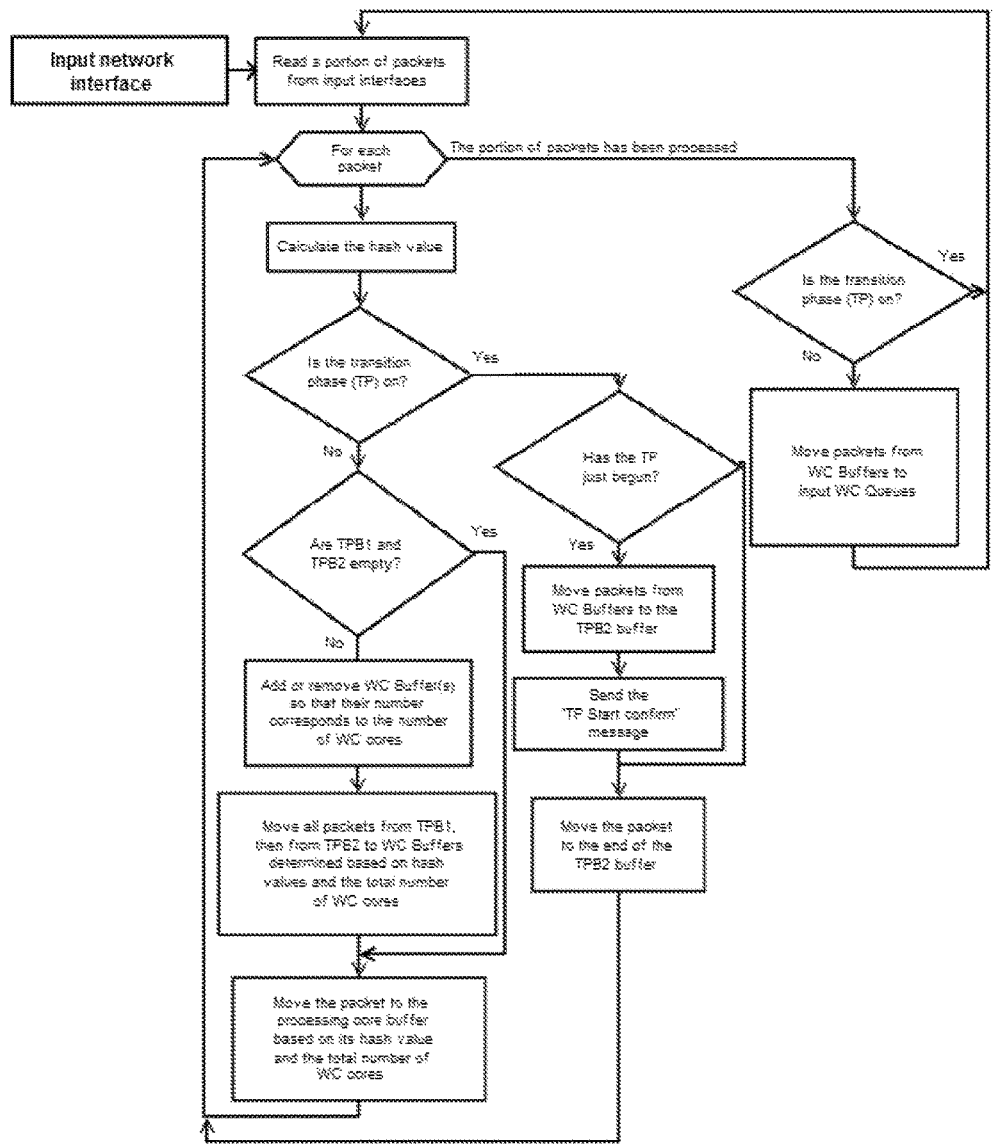
FIG. 8 depicts a block diagram of a method of the receiving core (RXC), in accordance with at least one non-limiting embodiment.

FIG. 8 depicts a block diagram of a method of a receiving core (RXC) with regard to the transition phase (TP), in further details, in accordance with at least one non-limiting embodiment.

In at least one non-limiting embodiment, the receiving core is continuously performing the following: it reads a portion of data packets from the input network interface, then, cyclically, takes the next data packet and calculates its convolution function value. Then, receiving core analyses, whether there is a transition phase; if not, it analyses, whether transition phase buffers are empty. If these buffers are not empty (which means that the transition phase has just ended), then the processing core first either empties extra buffers or adds more WC buffers (depending on whether the number of processing cores has been decreased or increased, respectively), and then moves all packets from TPB1 and TPB2 to WC buffers selected based on the data packet convolution function values and the number of processing cores. Then, the receiving core moves a data packet to a WC buffer based on the packet convolution function value, which has been calculated earlier, and the total number of WC cores. Then, this cycle is repeated for all remaining packets.

If, at an earlier step, it has been found out that there is a transition phase, then, the processing core may analyze when it started. If it has been found that the transition phase has just started, then all packets from all WC buffers may be moved to the transition phase buffer TPB2, and then the receiving core may confirm the start of the transition phase, and the packet, that is currently being processed, may be placed at the end of the transition phase buffer TPB2. Otherwise, the packet that is currently being processed may be immediately placed at the end of the transition phase buffer TPB2.

In at least one non-limiting embodiment, when the cycle for the given portion of data packets ends, the core analyzes whether there is a transition phase in process. If not, the packets from WC buffers are moved to a corresponding WC queue, then the next portion of data packets is read from the input network interface. If transition phase is in progress, then the next portion of data packets may be read from the input network interface.

Figure 9:
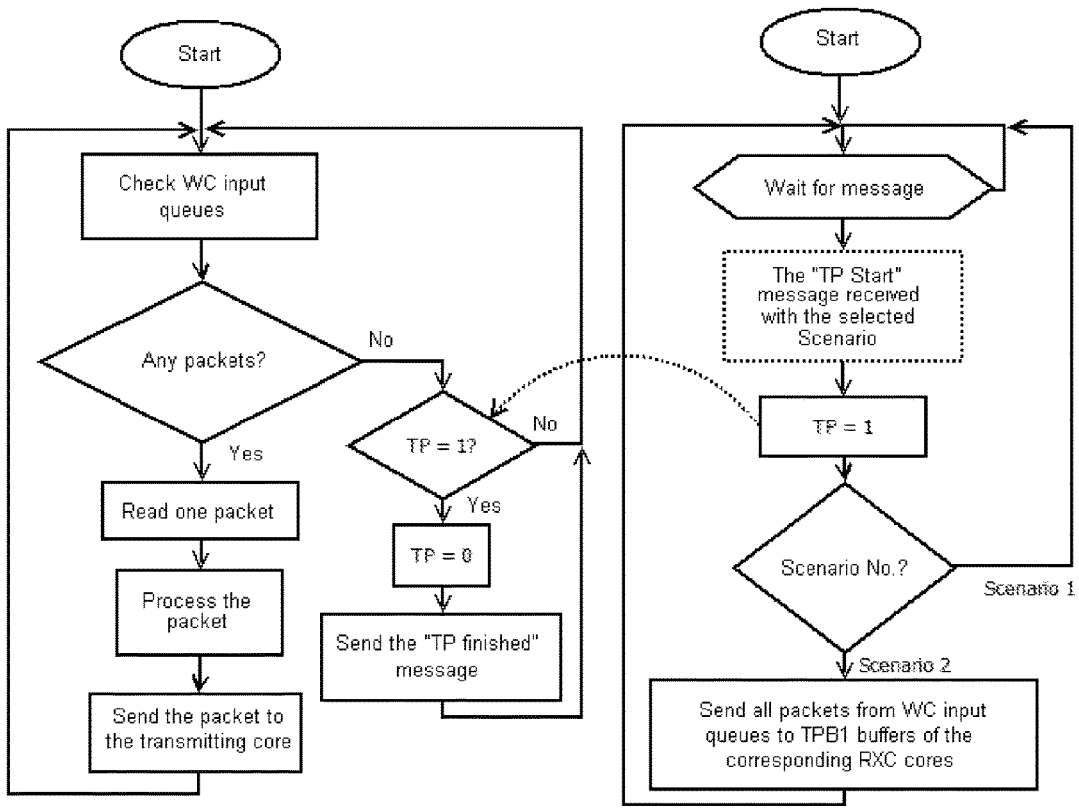
FIG. 9 depicts a block diagram of a method of the processing core, in accordance with at least one non-limiting embodiment.

FIG. 9 depicts a block diagram of a method of the processing core, in accordance with at least one non-limiting embodiment In at least one non-limiting embodiment, the processing core analyses whether there are any packets in the WC queue. If yes, the core reads them from the queue, processes them and then sends them to the TXC core. If there are no data packets in the queue, the core checks whether there is a transition phase in process (whether TP=1 condition is met, which may have been set by the listening thread). If there is a transition phase, then TP is set to 0, the system is notified that the transition phase is finished, and the core returns to checking whether there are data packets in the WC queue. Otherwise, if there is no transition phase, then the core immediately moves on to checking whether there are data packets in the WC queue.

All the while, the system is constantly waiting for the notification of the beginning of the transition phase. It may be implemented in a separate listening thread (its functionality is depicted and described with reference to FIG. 10). When such notification comes, the thread sets the transition phase attribute (TP=1), which will be then read by the processing core. After that, depending on the scenario received in the notification (see Scenario 1 and Scenario 2 above), the listening thread either starts to wait for new notifications (Scenario 1), or sends all the packets from its input queues $WC_1Queue_1 \ldots WC_1Queue_M$ to transition phase buffers TPB1 of corresponding $RXC_1 \ldots RXC_M$ cores, where M is the total number of receiving cores.

In at least one non-limiting embodiment, WCScaleManager additionally monitors the speed of queue size change on at least one WC core (e.g. by analyzing data on queue load (size), which are routinely fed to WCScaleManager by WC cores), and in case that speed exceeds some threshold value for a given period of time, it would initiate additional adjustment of the WC core total. Therefore, if the scale management routine has determined that the average size of a processing queue is higher than the first pre-determined upper queue threshold and that the speed of queue increase also exceeds its threshold, it would add one more WC.

In at least one non-limiting embodiment, if the speed of queue increase is higher than the second pre-determined threshold, then the scale management routine would add a pre-set number of WC cores (e.g. two).

Meanwhile, the queue increase speed threshold for at least one WC core may be set higher than the queue decrease speed threshold to process data more quickly while keeping the system efficient in terms of power.

Such thresholds may be set for both a single core queue, and the average queue size of all WC cores.

Example

The system may be deployed on a general-purpose server with a multi-core x86 processor (it may also be deployed on a multi-CPU system, including one based on x86-64, AMD64, ARM, etc. types of processors). The system may have one or more network interface controllers (NIC).

The OS scheduler may be requested to distribute RXC, TXC, and WC among individual CPU cores, wherein each RXC, TXC, and WC would operate exclusively on its dedicated CPU core. WCScaleManager may then run on a CPU core that is not dedicated to either RXC, TXC, or WC.

The OS scheduler may also operate on the core level (ring0), where CPU pinning is carried out, wherein each thread is assigned a CPU core that would carry out the given thread. Assume that the system is operating with 2 RXC, 2 TXC, and 2 WC, wherein:

WCScale Manager—is run on Core1;
$RXC_1$—is run on Core1;
$RXC_2$—is run on Core3;
$TXC_1$—is run on Core4;
$TXC_2$—is run on Core5;
$WC_1$—is run on Core6; and
$WC_2$—is run on Core7.

WCScaleManager is configured with the WC number adjustment rules.

Examples of rules and their variants are described herein in the "Threshold values for core number adjustment" section.

Assume that there are the following rules:
Rule1: CU>80% [10 s]=+1
Rule2: CU<20% [10 s]=−1

WCScaleManager starts monitoring metrics listed in its ruleset. The list of metrics monitored by WCScaleManager is described herein in the "Threshold values for core number adjustment" section.

In the example provided, WCScaleManager monitors CU—average CPU core load of WCs.

If the arithmetic mean of Core6 and Core7 loads exceeds 80% for 10 seconds in a row, then Rule1 may be triggered. This rule may make the system to add one more WC.

WCScaleManager sends the "TPStart" signal to $RXC_1$ and $RXC_2$.

For instance, WCScaleManager may send this signal directly, via inter-thread communication.

In the example non-limiting embodiment, $RXC_1$ and $RXC_2$ move all packets from WC buffers to their respective transition phase buffers $RXC_1$:TPB2 and $RXC_2$:TPB2. After that, they send the "TPStartConfirm" signal to WCScaleManager. $RXC_1$ and $RXC_2$ continue to receive packets from corresponding NIC buffers, but after receiving them, they send packets not to the corresponding WC buffers, but to the transition phase buffer TPB2.

WCScaleManager is waiting for the "TPStartConfirm" signals from $RXC_1$ and $RXC_2$. After both signals have been received, WCScaleManager sends the "TPStart" signal to $WC_1$ and $WC_2$ with Scenario 2 (adding WC). After that, it sends the command to the OS scheduler to run a new WC on a separate core and waits until it is carried out.

Having received the "TPStart" signal, $WC_1$ and $WC_2$ use Scenario 2 (adding WC), sending all packets from their respective WC queues to the transition period buffer TPB1 of the corresponding RXC, then they send the "TPFinished" signals to WCScaleManager and resume their normal operations waiting till their WC queues are filled with new packets to be processed.

WCScaleManager waits for the "TPFinished" signals from $WC_1$ and $WC_2$ and for the status update from the OS scheduler on adding a new WC.

The OS scheduler runs a new processing core $WC_3$ on the CPU Core8.

Having received all the signals, WCScaleManager sends the "TPFinished" signal to $RXC_1$ and $RXC_2$.

Having received the "TPFinished" signal, $RXC_1$ and $RXC_2$ add new $WC_3$ buffers for the new processing core. Then, they process packets in transition period buffers TPB in order: first, TPB1, then TPB2, wherein processing means sending data packets to corresponding WC buffers, depending on their packet convolution function values and the total number of WC (which is 3). Having processed their TPB1 and TPB2 respectively, $RXC_1$ and $RXC_2$ resume their normal operations.

A core is released in the similar way.

WCScaleManager monitors the CU—average CPU core load of WCs. If the arithmetic mean of Core6 and Core7 loads is lower than 20% for 10 seconds in a row, then Rule2 is triggered. This rule makes the system to release one WC.

A following sequence may be similar to the sequence described above.

Numerous modifications, changes, variations, substitutions, and equivalents will be apparent to those skilled in the art, without departing from the spirit and scope of the present technology, as described in the claims.

Elements mentioned in singular may also be read in plural, if not stated otherwise.

Functional interconnection between elements should read as an interconnection that allows them to interact correctly with each other in order to carry out their functions. Specific examples of such functional interconnection may include information exchange connections, electric current transfer connections, mechanical movement transfer connections, light, sound, electromagnetic or mechanical oscillation transfer connections, etc. Specific type of functional interconnection is determined by the way said elements are connected to each other and is implemented by conventional means and conventional principles of the art, if not stated otherwise.

The methods disclosed herein comprise one or more steps or actions needed to carry out said methods. These steps and/or actions are interchangeable within a method, without departing from the scope of the present technology, as described in the claims. In other words, if the present disclosure does not explicitly state a specific order of said stages and/or actions, they may be replaced with one another, without departing from the scope of the present technology, as described in the claims.

Even though the present application does not provide details, which software and hardware are used to implement the units illustrated by the accompanying drawings, but it should be apparent to those skilled in the art that the subject matter is not by any means limited by a specific hardware-and-software embodiment, therefore any suitable software and hardware means may be used. As such, hardware means may include any type of specialized integrated circuits, digital signal processors, digital signal processing devices, programmable logical devices, field-programmable gate arrays, CPUs, controllers, microcontrollers, microprocessors, electronic devices, other types of electronic modules, capable of performing functions disclosed herein, such as computer or any combination of the above.

Though not stated explicitly, it should be apparent to those skilled in the art, that storage media will be used to store data, applications, etc., wherein such storage media may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing data.

While various embodiments of the present technology have been illustrated and described, it should be clear that the present technology is not limited to these embodiments only. Numerous modifications, changes, variations, substitutions, and equivalents will be apparent to those skilled in the art, without departing from the spirit and scope of the present technology, as described in the claims.

Limitations set forth in dependent claims, as well as embodiments disclosed in the detailed description may be used in many combinations and subcombinations to various benefits, whether or not such combinations and subcombinations have been explained explicitly.

What it claimed, is:

1. A method for processing a data packet, the method executable by an electronic device, the electronic device including a plurality of CPU cores, the electronic device executing a scale management routine, the method comprising:
   receiving a plurality of data packets to be processed;
   initiating processing of the plurality of data packets by the plurality of CPU cores;
   tracking, by the scale management routine, processing queues for the plurality of CPU cores and their load;
   in response to an average size of a processing queue being lower than a first pre-determined queue threshold, and a CPU core load being lower than a first pre-determined load threshold,
   preventing, by the scale management routine, adding new data packets to the processing queue,
   monitoring emptying of processing queues for each processing CPU core,
   in response to a given queue for a given processing core having been emptied, decreasing a number of processing cores by one,
   initiating data packet processing using a decreased number of processing cores;
   in response to at least one of: an average size of a processing queue or a CPU core load being above than a second pre-determined upper queue threshold or the second pre-determined load threshold, respectively:
   transmitting, by the scale management routine, all data from processing queues for each processing CPU core to a memory buffer,
   increasing the number of processing cores by one; and
   initiating data packet processing using an increased number of cores.

2. The method of claim 1, the method further comprising decreasing, by the scale management routine, the number of processing CPU cores by two, if the average size of a processing queue is lower than a second pre-determined queue threshold.

3. The method of claim 1, the method further comprising tracking, by the scale management routine, time during which at least one of either the average size of a processing queue or the CPU core load is lower than the first pre-determined queue threshold or the first pre-determined load threshold, respectively, and in case said time exceeding a pre-determined value, decreasing the number of processing CPU cores.

4. The method of claim 1, the method further comprising increasing, by the scale management routine, the number of processing CPU cores by two, if the average size of a processing queue is higher than a second pre-determined lower queue threshold.

5. The method of claim 1, the method further comprising tracking, by the scale management routine, time during which at least one of either the average size of a processing queue or the CPU core load is above the first pre-determined queue threshold or the first pre-determined load threshold, respectively, and in case said time exceeds a pre-determined threshold value, increasing the number of processing CPU cores.

6. The method of claim 1, the method further comprising determining, by the scale management routine, the rate of change of the average size of a processing queue, and in case said rate exceeding a pre-determined threshold value, further adding a pre-determined number of processing cores.

7. The method of claim 5, wherein the scale management routine sets the threshold time value based on the CPU core load, and wherein the higher the load is, the lower the threshold time value.

8. The method of claim 1, wherein the decreasing a number of processing cores by one is executed only if the there is more than one processing core.

9. The method of claim 1, wherein the increasing the number of processing cores by one is executed only if a maximum capacity is not reached.

10. A device for data packet processing, comprising:
    an input interface configured to receive data packets;
    a plurality of cores configured to process data packets;
    a memory configured to store data;
    an output interface configured to transmit data packets that have been processed;

a scale management routine configured to redirect data packets and determine the number of cores;

the plurality of cores including;

a plurality of receiving cores configured to process data packets sent by the input interface in their queues and then to send these packets to the queues of processing cores;

a plurality of processing cores configured to process data packets sent in their queues and then to send processed packets to the queues of transmitting cores;

a plurality of transmitting cores configured to process data packets sent in their queues and then to send these packets to the output interface;

wherein the device for data packet processing is configured to:

receive a plurality of data packets to be processed;

initiate processing of the plurality of data packets by the plurality of CPU cores;

track, by the scale management routine, processing queues for the plurality of CPU cores and their load;

in response to an average size of a processing queue being lower than a first pre-determined queue threshold, and a CPU core load being lower than a first pre-determined load threshold, prevent, by the scale management routine, adding new data packets to the processing queue, monitor emptying of processing queues for each processing CPU core, in response to a given queue for a given processing core having been emptied, decreasing a number of processing cores by one, initiate data packet processing using a decreased number of processing cores;

in response to at least one of: an average size of a processing queue or a CPU core load being above than a second pre-determined upper queue threshold or the second pre-determined load threshold, respectively:

transmit, by the scale management routine, all data from processing queues for each processing CPU core to a memory buffer, increase the number of processing cores by one; and initiating data packet processing using an increased number of cores.

* * * * *